United States Patent [19]

Krzepinski

[11] Patent Number: 4,690,626
[45] Date of Patent: Sep. 1, 1987

[54] ROTATIONAL MOLD SYSTEM WITH MULTIPLE STATIONS

[76] Inventor: Horst Krzepinski, Schulstrasse 23, 6837 St. Leon-Rot 1, Fed. Rep. of Germany

[21] Appl. No.: 785,548

[22] Filed: Oct. 8, 1985

[30] Foreign Application Priority Data

Oct. 10, 1984 [DE] Fed. Rep. of Germany ... 8429732[U]

[51] Int. Cl.⁴ .............................................. B29C 41/04
[52] U.S. Cl. ..................................... 425/88; 414/152; 414/222; 425/161; 425/429
[58] Field of Search ............... 425/182, 186, 378, 429, 425/430, 434, 407, 435, 88, 441, 534, 161; 414/152, 157, 158, 173, 222, 225, 751

[56] References Cited

U.S. PATENT DOCUMENTS

| | | | |
|---|---|---|---|
| 3,796,327 | 3/1974 | Meyer et al. | 414/222 |
| 3,868,207 | 2/1975 | Otsuki et al. | 425/88 |
| 4,247,279 | 1/1981 | Masters | 425/434 |
| 4,373,840 | 2/1983 | Miller, Jr. | 414/751 |
| 4,483,651 | 11/1984 | Nakane et al. | 414/222 |

FOREIGN PATENT DOCUMENTS

| | | | |
|---|---|---|---|
| 2365148 | 7/1974 | Fed. Rep. of Germany | 425/435 |
| 1378965 | 1/1975 | United Kingdom | 425/435 |
| 1547470 | 6/1979 | United Kingdom | 414/222 |

OTHER PUBLICATIONS

Engineering Design Handbook, "Rotational Molding of Plastic Powders," AMC Pamphlet, AMCP 706-312, Headquarters, U.S. Army Material Command, pp. 3-1 thru 3-10, Apr. 1975.
Caccia Catalog, "Rotaut, Rotar, Rotex," of Officine Meccanighe Caccia.

Primary Examiner—Jay H. Woo
Assistant Examiner—J. Fortenberry
Attorney, Agent, or Firm—Staas & Halsey

[57] ABSTRACT

A rotary molding apparatus is described, including a heating chamber, cooling chambers and supports for molds which melt and cast workpieces of plastic. The cooling chambers can be arranged circularly around the heating chamber which is disposed at the center, or the heating chamber can be movable such that an opening thereof can be selectively aligned to one of the cooling chambers. The molds can be moved via the supports from a cooling chamber to the heating chamber and back again. This apparatus optimizes component utilization and minimizes cycle times.

14 Claims, 4 Drawing Figures

ROTATIONAL MOLD SYSTEM WITH MULTIPLE STATIONS

BACKGROUND OF THE INVENTION

The present invention relates to the layout for a rotary device (e.g., a rotational molding system), comprising a manipulation station (e.g., a loading and unloading station), a heating chamber, a cooling chamber and the support of at least one tool such as a machine tool or mold for melting or casting workpieces particularly of plastics.

With this kind of layout plastic hollow articles can be manufactured by melting and casting corresponding to the shape of the tool by means of the rotation process.

In a known layout the tool is filled with the required plastics powder on the manipulating station and upon closing by means of the rotary device the tool is put in double rotary motion about two shafts which are vertical relative to each other. By means of a special layout having three working arms arranged radially about a center, a heating chamber, at least one cooling chamber and a manipulating station being joined in tandem on a circle around this center the filled and closed tool is rotatably swung with one working arm into the heating chamber. At the same time, another tool having previously been in the heating chamber is removed by means of a second arm and moved into the cooling chamber while it is still rotating. A further tool is conveyed by means of the third arm from the cooling chamber to the manipulation station, on which the tool or the mold is opened and the finished workpiece is removed. With this type of layout, workpieces having the most varied shapes and sizes can be produced.

Repeatedly divided tools for increasingly more complex workpieces, numerous tool inserts for molded-on connecting pieces, threads, tube nozzles, and the like, as well as various adjusting pieces in the form of nuts, sleeves, flanges, etc., result in increasingly longer manipulation times on the manipulating station while the heating times can be reduced.

The cooling times for the individual articles can vary quite substantially. In this layout two arms must subordinate themselves to the technologically cogent predetermined single cycle time of the third arm and, therefore, disadvantageously they can almost never run with their optimal cycle times.

In conventional layouts this kind of varied article program with possibly different cycle parameters and increasingly smaller manufacturing lot sizes and thus increased assembly steps results in unfavorable degrees of machine utilization and thus increases the production costs.

SUMMARY OF THE INVENTION

Therefore, it is an object of the present invention to develop the type of layout mentioned at the outset such that each individual tool support is charged with its optimal number of workpieces and can be run with the optimal cycle times for heating, cooling and manipulating and that an altogether economical production at a favorable cost is thus assured. The layout should have a simple structure to optimize the degree of utilization. At the same time it should be possible to predetermine varying times for using heating chamber, cooling chamber, manipulation station and corresponding cycle times according to requirements. The layout should have a compact type of construction and it should avoid a stoppage of two arms when changing the program, tool breakdowns or extremely long single cycle times of the third arm.

In order to achieve these objects, it is proposed to arrange at least three cooling chambers circularly around a center in which the heating chamber is disposed. Furthermore, the corresponding manipulation station is disposed in the radial direction on the outside, ahead of the respective cooling chamber.

The layout according to the present invention is distinguished by a compact and truly functional construction and assures an optimal degree of total utilization.

According to the present invention several supports with tools or molds therein shuttle independently of each other between the sole heating chamber and the manipulation stations and cooling chambers. As desired, at least three, but preferably four or five cooling chambers together with manipulation stations, are disposed radially with respect to the centrally arranged heating chamber. The freely movable tool supports radially shuttle to and fro between the heating chamber and the cooling chamber and manipulation station. It must be explicitly emphasized that according to the present invention the manipulation can also be carried out in the cooling chamber. The combination of the most varied single cycles for the tool concerned, that is to say, with regard to heating, cooling and manipulating, can be realized in a particularly rational manner regarding economy and schedule. Furthermore, the simultaneous moving out and in of the two tool supports into the heating chamber and/or the cooling chamber is essential. Because of the layout proposed by the present invention the paths between the heating chamber, cooling chamber and manipulation station disposed immediately ahead thereof are extremely short and the type of construction is compact.

Losses of time due to the variety of articles, increasingly smaller lot sizes, and more complex geometry of the workpieces, are avoided in an optimal manner by arranging the cooling chamber in the radial direction ahead of the heating chamber with low cost of construction and space requirement as proposed by the present invention. The time problem resulting from reduced heating times and cooling times of varying length with ever increasing manipulation times is solved in a surprisingly simple manner.

In a special embodiment the cooling chambers, which are disposed radially with respect to the heating chamber, are directly built on to the heating chamber. The paths between the heating chamber and cooling chambers are extremely short, making it possible for two tool supports to move out and in simultaneously in a controlled manner.

According to another important embodiment, a storage space for a second tool support is disposed directly next to the manipulation station. On this storage space the second tool support can be prepared and manipulated for a tool replacement so that machine stoppages can be prevented in the case of program change, tool obstructions or even at very long manipulation times. Thus, even during a night shift a change of program can be planned, prepared and also realized without difficulty and without requiring the presence of maintenance personnel for this purpose. Even tests and minimum lot sides can be included in the manufacturing process without problems.

The present invention comprises quite generally all the embodiments in which the tool support with the rotary device and the tool are movable independently of each other and at least three cooling chambers are provided. Thus, within the scope of the present invention the heating chamber can be so arranged that it is rotatable about a vertical shaft. In this embodiment the heating chamber with its entrance opening for the tool support is so rotated that the tool support and thus the tool can be moved into the heating chambers from different radial directions in which the cooling chambers are also arranged. The heating chamber can be designed to be very compact so that substantial savings in space and material can be attained. Only a single entrance opening is required so that substantial advantages with regard to sealing and energy consumption are attained.

In a further embodiment the three cooling chambers are arranged side by side in a row and the heating chamber is in turn movable parallel to said cooling chambers. The entire layout requires a minimum of space and the cooling chambers arranged directly side by side require together a comparatively low manufacturing expenditure and a low consumption of material.

Furthermore, layouts in which the heating chamber is movable in the vertical direction also are within the scope of the present invention. In this case the heating chamber is shaped like a bell open at the bottom and is lifted vertically upwards by a lifting device. After moving the tool under the heating chamber the latter can be lowered again. The energy requirement of this layout is extremely low since on lifting the heating chamber, which is open at the bottom, most of the heat remains stored in the heating chamber.

Finally it is emphasized that in all the embodiments according to the present invention only the tool and the rotary device with its arm, which freely juts out horizontally, projects into the heating chamber and cooling chambers for heating and cooling, respectively, while the driving unit and the tool support remain outside said chambers. This assures an extremely compact type of construction for all the embodiments so that substantial savings in space and material and an altogether low structural expenditure are achieved.

Further advantages and important features will explained hereafter by means of the practical example shown in the drawings.

BRIEF DESCRIPTION OF THE DRAWINGS

FIG. 1 shows diagrammatically a plan view of the layout with five cooling chambers 2 arranged on a circle, the heatin chamber 4 being disposed at its center. A tool support 6 which contains a tool 8, i.e., a mold for producing a hollow article, is shown in the heating chamber 4. The tool 8 is put in an exactly controlled double rotation, i.e., a tumbler movement about two shafts disposed vertically to each other, by a rotary device 9 disposed on the tool support 6 so that the plastic powder on the inside of the tool 8 can spread uniformly over the inner surface of the tool 8.

Figure 1:
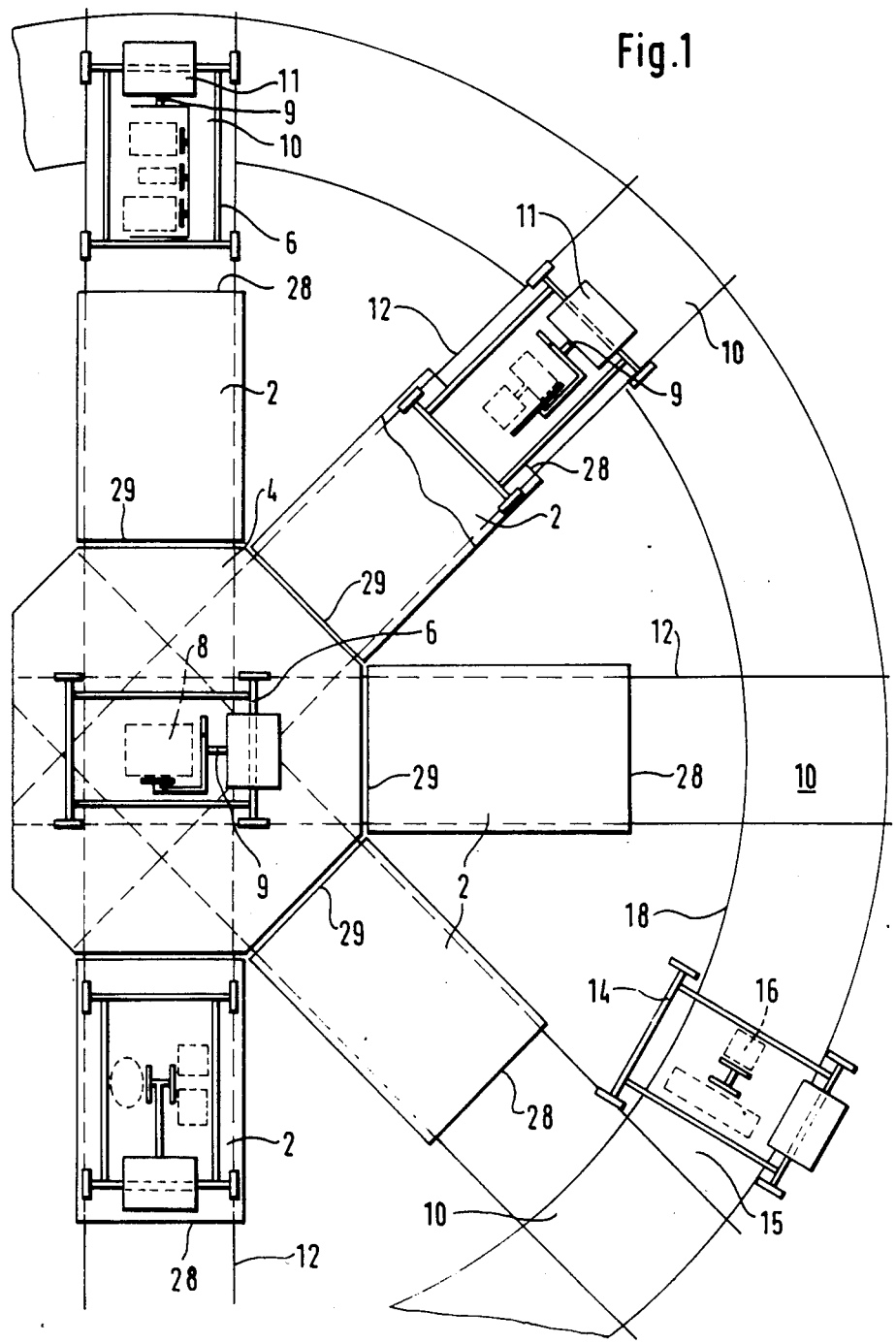
FIG. 1 shows in diagrammatic representation a plan view of a layout with a radially disposed cooling chamber and a single heating chamber arranged at the center.

The cooling chambers 2 are built directly on to the heating chamber 4 and can be closed by doors 28,29. A manipulation station 10 is disposed ahead of each cooling chamber 2. A conveyer line 12 (shown dotted), i.e., a track, extending through the corresponding cooling chamber 2 is provided between the manipulation station 10 and the heating chamber 4. In this case the tool support 6 is designed as a cart and together with the tool 8 it is slidable on its wheels on the conveyor track 12. The tool support 6 contains a driving unit by means of which the rotary device 9 is driven to the double rotation. Within the scope of the present invention the tool support 6 can be moved with the driving unit when required.

In the present embodiment the tool 8 on the tool support 6 can be manipulated on each of the five manipulation stations 10. At the manipulation station 10 the open mold or tool is charged with material, the tool is closed and, on heating, cooling and opening the tool the finished product is removed. Furthermore, the tool can also be replaced on the manipulation station 10. Within the scope of the present invention the conveyor lines 12 (five in the present case) are arranged radially with regard to the centrally arranged heating chamber 4 and pass through the corresponding cooling chamber 2 to the corresponding manipulation station 10.

Within the scope of the present invention a storage space 15 and/or a second tool support 14 is assigned to each manipulation station 10. For reasons of clarity only a single storage space 15 is shown in the drawings. Said additional tool support 14 is on a storage space 15 next to the manipulation station 10. A completely mounted follow-up tool 16 is disposed on the tool support 14 so that a change in program can be carried out without impairing production, after moving the additional tool support 14 to the manipulation station 10. It should be noted that different tools or molds for producing hollow articles of the most varied sizes, shapes, etc., can be disposed on each of the individual tool supports 6 and 14. For conveying the tool support or supports 14 to the manipulation stations 10 there is provided a further conveyor line 18 which is indicated in the drawing by circular lines and according to the present invention represents a circular path around the center and the heating chamber 4. When required, the individual tool supports 14 can thus be moved from the one conveyor line to the other line 12.

Figure 2:
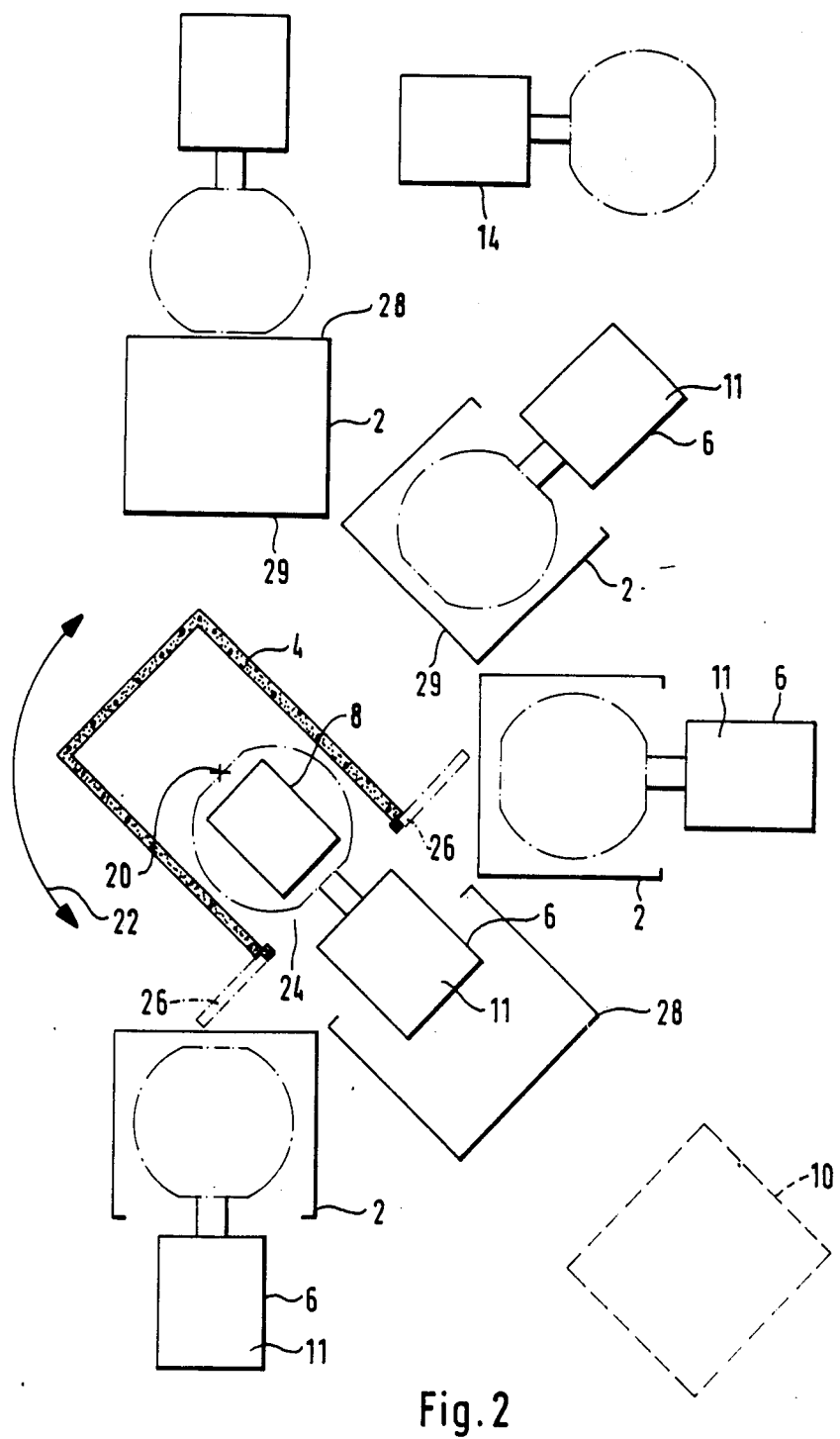
FIG. 2 shows in diagrammatic representation a layout in which the heating chamber is so arranged that it is rotatable about a horizontal shaft.

FIG. 2 shows diagrammatically a layout which fundamentally corresponds to the layout described above. However, the heating chamber 4 is now so arranged that it is rotatable about a vertical shaft 20 corresponding to the arrow 22. The heating chamber 4 with its entrance opening 24 can be selectively aligned to one of the five cooling chambers 2. The heating chamber 4 is distinguished by a compact construction; it has only a single entrance opening 24, which is closed by doors 28 when heating. At opposite ends, the cooling chambers 2 have doors 28,29 or corresponding means which permit the entry and passage of the tool support 6 together with tool 8 and rotary device 9 on the one hand and can be closed for cooling the tool 8 on the other. The maximally possible limits of motion of the rotary device, namely the so-called rotation diameter, including the tool 8 during the rotation are indicated by dash-and-dot lines.

Figure 3:
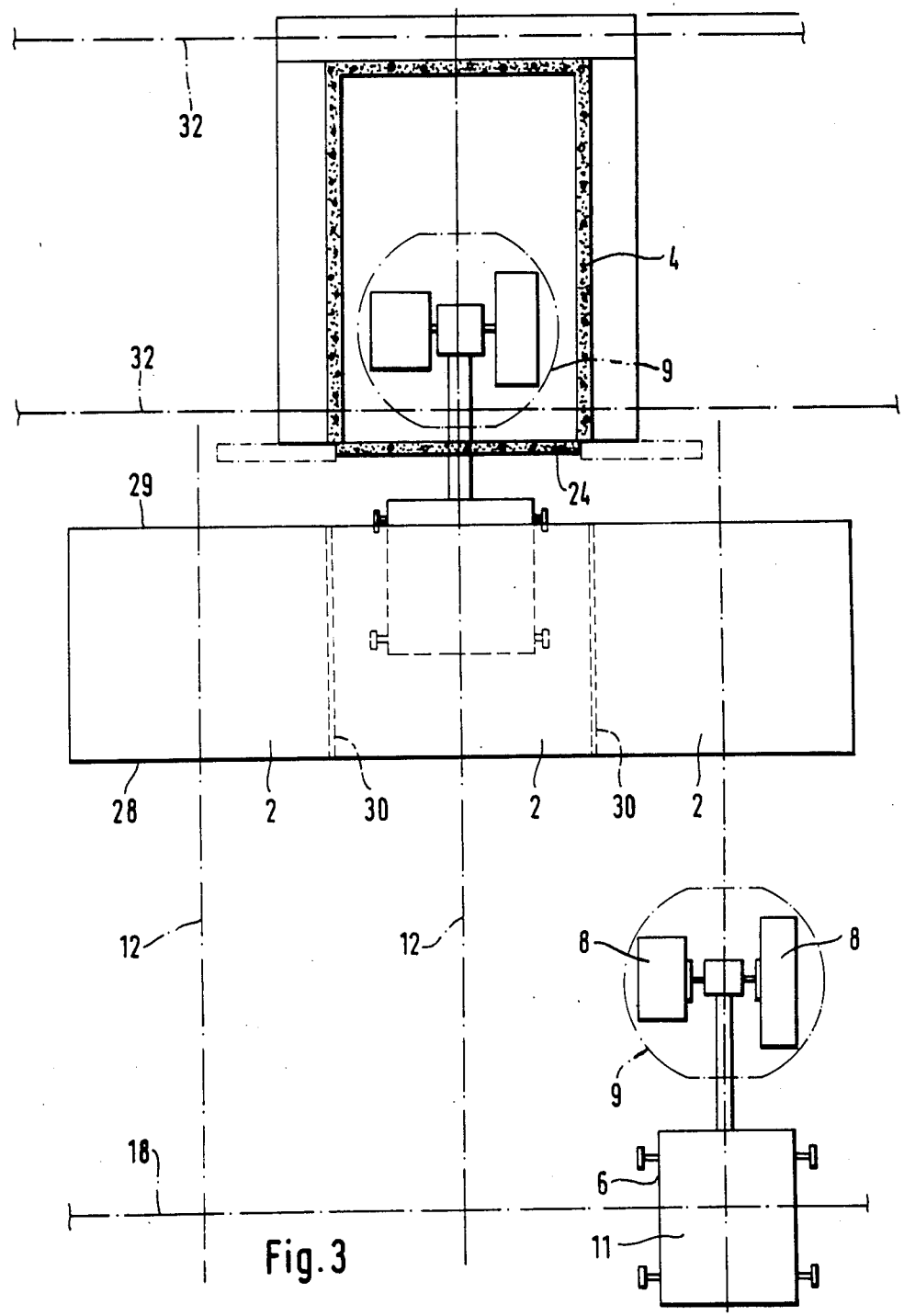
FIG. 3 shows in diagrammatic representation a layout with three cooling chambers arranged side by side in a row and with a heating chamber movable parallel to the cooling chamber.

FIG. 3 shows a layout with three cooling chambers arranged side by side in a row. The individual cooling chambers 2 are separated from each other by means of partitions 30. The heating chamber 4 can be moved along a track 32 parallel to the cooling chambers 2. The track 32 extends in a horizontal plane at right angles to the conveyor tracks 12 for the tool supports 6. Corresponding to the layout according to FIG. 1 a further conveyor track 18 is also present in this embodiment. On said conveyor track 18 the tool supports 6 can be moved from one conveyor track to another conveyor track 12 or to a storage space. According to the present invention the number of conveyor carts 6 and tool supports 8 can be greater than the number of cooling chambers 2 for the reasons described above.

Figure 4:
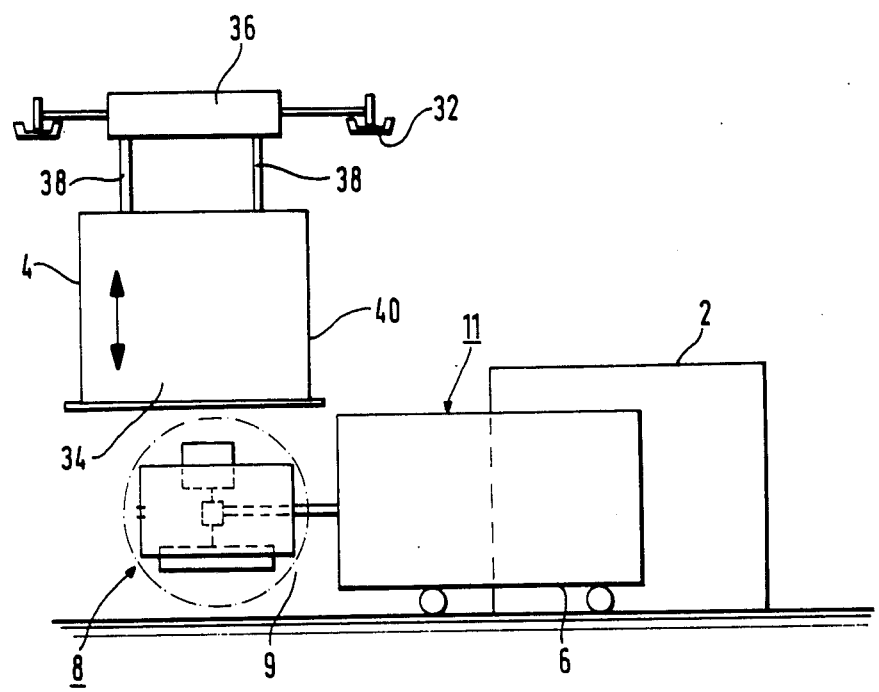
FIG. 4 shows a lateral view of a layout similar to that of FIGS. 1 to 3, in which the heating chamber is movable vertically.

A lateral view of a layout similar to that of FIG. 3 is shown in FIG. 4. However, the heating chamber 4 is so disposed that it can also be moved vertically. The heating chamber 4 is designed like a bell, which is completely closed at the top and on the sides and has an opening 34 at the bottom. The heating chamber 4 is suspended from a lifting device 36 by wire ropes 38 or the like and is movable along the track 32. The lifting device 36 is movable on the track 32 similar to a trolley used conventionally in factory buildings. The track 32 suitably contains supporting rails which are supported in corresponding supporting structures of the engine room in a conventional manner. The tool support 6, with the driving unit 11 and the rotary device 9 thereon, carries at least one tool 8.

The tool 8 is positioned under the heating chamber 4 by moving the tool support 6, at which point the heating chamber can be lowered down to the bottom 36 by the lifting device 36. It can be seen that exclusively the tool 8 together with the rotary device remains inside the heating chamber 4, while the driving unit 11 is outside the heating chamber.

In the side wall 40 of the heating chamber 4 there is provided an opening which extends in the vertical direction and through which the substantially horizontal, freely jutting arm of the rotary device 9 is passed. However, this opening can be closed with suitable means.

In FIG. 4, as in all the layouts according to the present invention, only the tool 8 with the rotary device 9 are moved into the heating chamber, while the driving unit and the tool support remain outside the heating chamber when heating. The heating chamber requires a correspondingly small structural volume and the energy costs can be kept low. Furthermore, thermal stresses of the driving unit and of the tool support are avoided to a great extent so that substantial advantages with regard to service life and functional reliability are attained.

It is evident that in the layouts according to the present invention the individual tool supports can correspondingly shuttle from the manipulation station to the heating chamber and cooling chamber independently and the most varied single cycles for manipulating, heating and cooling can be maintained in an optimal manner and adapted to each other so as to assure an economical total use and utilization of the layout.

Within the scope of the present invention the cooling of the tools in each cooling chamber 2 is carried out with air or also with water. It has been found that the gentle cooling by air is particularly favorable. Since the cooling chamber 2 is directly built on to the central heating chamber 4 or is arranged in the immediate vicinity thereof, extremely short paths are realized and it has been found that the simultaneous moving out and in of two tool supports is particularly suitable. The degree of utilization of each individual tool support or cart practically depends on maintaining the predetermined manipulation time and can be optimized by suitable production engineering and control. As compared with conventional layouts an appreciable increase in capacity is also attained and particularly with frequent program change and varying cycle parameters. In addition it must be particularly emphasized that in the layout according to the present invention the manipulation times to be predetermined must be planned and controlled independently of the machine strokes.

What is claimed is:

1. A rotational molding apparatus, comprising:
   a mold filling station;
   a heating chamber;
   means for supporting at least one mold for forming workpieces; and
   at least three cooling chambers arranged operatively adjacent and circularly around a center at which the heating chamber is disposed;
   wherein said mold is movable between said mold filling station, said heating chamber and said cooling chambers.

2. An apparatus according to claim 1, wherein the mold filling station is disposed radially outward from a corresponding cooling chamber.

3. An apparatus according to claim 1, wherein the cooling chambers are arranged radially outward from and attached to the heating chamber.

4. An apparatus according to claim 1, further comprising a storage station having a further mold support means and being disposed directly next to the mold filling station.

5. An apparatus according to claim 1, further comprising a straight-line conveyor track disposed between the mold filling station and the heating chamber.

6. An apparatus according to claim 1, further comprising a conveyor track extending through the cooling chambers into the heating chamber.

7. An apparatus according to claim 6, further comprising a curved conveyor track around the heating chamber.

8. An apparatus according to claim 7, wherein said support means comprises carts movable along said straight line conveyor track and said curved conveyor track.

9. An apparatus according to claim 8, further comprising a rotary device rotatably mounted on said support means.

10. An apparatus according to claim 1, further comprising a shaft having the heating chamber pivotally attached thereto and wherein the heating chamber has an entrance opening capable of being selectively aligned to one of the cooling chambers.

11. A molding apparatus, comprising:
    a track;
    means for supporting at least one mold;
    a plurality of cooling chambers arranged side by side next to said track; and
    a heating chamber movably mounted on said track such that said heating chamber can be selectively aligned to one of the plurality of cooling chambers;
    wherein said mold is movable between said cooling chambers and said heating chamber.

12. An apparatus according to claim 11, further comprising lifting means for lifting the heating chamber and wherein, said heating chamber has a lower opening positioned such that when the mold is moved under the heating chamber, the mold is on the inside of the heating chamber upon lowering said heating chamber.

13. An apparatus according to claim 1, further comprising a plurality of mold filling stations and a plurality of support means, each including a rotary device, wherein each of the cooling chambers has a door on each opposite end thereof, a first one of the plurality of support means can be moved through the doors of the cooling chamber, and the mold and rotary device thereof can be moved into the heating chamber, while the remaining support means, each being movable independently of the others, are each respectively selectively positioned within one of the remaining cooling chambers and one of the remaining mold filling stations.

14. A rotational molding apparatus, comprising:

at least one station for opening a rotatable mold and removing a workpiece from said mold;

a centrally located heating chamber;

at least three cooling chambers radially disposed relative to said heating chamber; and at least one rotatable mold for forming workpieces and support means for supporting said at least one rotatable mold, wherein said mold is movable between said heating chamber and said cooling chambers.

* * * * *